US006865667B2

(12) United States Patent
Moyer et al.

(10) Patent No.: US 6,865,667 B2
(45) Date of Patent: Mar. 8, 2005

(54) DATA PROCESSING SYSTEM HAVING REDIRECTING CIRCUITRY AND METHOD THEREFOR

(75) Inventors: William C. Moyer, Dripping Springs, TX (US); Jeffrey W. Scott, Austin, TX (US); John H. Arends, Austin, TX (US)

(73) Assignee: Freescale Semiconductors, Inc., Austin, TX (US)

( * ) Notice: Subject to any disclaimer, the term of this patent is extended or adjusted under 35 U.S.C. 154(b) by 568 days.

(21) Appl. No.: 09/798,390

(22) Filed: Mar. 5, 2001

(65) Prior Publication Data

US 2002/0124161 A1 Sep. 5, 2002

(51) Int. Cl.[7] .................................................. G06F 9/00
(52) U.S. Cl. ........................................................ 712/234
(58) Field of Search ................................ 712/234, 223

(56) References Cited

U.S. PATENT DOCUMENTS

| | | | | |
|---|---|---|---|---|
| 4,802,119 | A | | 1/1989 | Heene et al. ................ 364/900 |
| 5,802,549 | A | | 9/1998 | Goyal et al. ................. 711/102 |
| 5,901,225 | A | * | 5/1999 | Ireton et al. ..................... 714/7 |
| 6,073,252 | A | | 6/2000 | Moyer et al. .................... 714/7 |
| 6,327,704 | B1 | * | 12/2001 | Mattson et al. ............. 717/153 |
| 6,438,664 | B1 | * | 8/2002 | McGrath et al. ............. 711/154 |
| 6,650,880 | B1 | * | 11/2003 | Lee et al. .................... 455/259 |

OTHER PUBLICATIONS

Motorola Inc., "Motorola High–Performance DSP Technology DSP 56600 Family Manual", http://www.motorola-dsp.com., Section 6: Program Patch Logic, pp. 6-1—6.5.

* cited by examiner

Primary Examiner—Eric Coleman
(74) Attorney, Agent, or Firm—Joanna G. Chiu; Robert L. King

(57) ABSTRACT

Embodiments of the present invention relate generally to data processing systems having redirecting circuitry. For example, one embodiment relates to redirecting program flow in a data processing system having a data processor for executing instructions, and circuitry that redirects program flow by identifying an address corresponding to an instruction provided to the data processor for which program execution should be redirected when the instruction is decoded by the data processor. The circuitry also generates a control field having an offset corresponding to the address and using the control field to determine when program flow should be redirected. The circuitry creates a redirected address value by combining a portion of the control field with a predetermined address. The data processor implements redirection of program flow by utilizing the redirected address value. Embodiments also relate to redirecting data accesses and to redirecting program flow while remaining in a same execution context.

35 Claims, 3 Drawing Sheets

DATA PROCESSING SYSTEM HAVING REDIRECTING CIRCUITRY AND METHOD THEREFOR

FIELD OF THE INVENTION

The present invention relates generally to data processing systems, and more specifically, to data processing systems having redirecting circuitry.

RELATED ART

Many data processing systems in the art today require circuitry for redirecting program flow. For example, read only memory (ROM) patching is a product requirement for many embedded microcontroller designs, and in any environment where a possibility exists of uncovering a problem in a piece of application code or data embedded in ROM memory. This is partly due to the turnaround time of mask sets to correct the problem, as well as the potential for many units incorporating the faulty code to be in existence in the field.

Traditionally, ROM patching involves a set of programmable comparators for address or address ranges, which when matched, cause an interrupt exception to occur. For example, this type of ROM patching is discussed in U.S. Pat. No. 6,073,252, Moyer et al. However, exceptions require the processor to be in a state where exceptions can be handled. This requires the processor to alter the current execution context and save and restore the processor state. Furthermore, during portions of code where exceptions are inhibited, no patching may occur if the patch control mechanism is via forcing an exception.

Other traditional ROM patching schemes include opcode substitution where a delay path is added on the time critical data input path to force a substituted instruction such as an absolute jump. For example, this method is utilized by the Motorola part, DSP56600FM/AD. However, memory timing must also be taken into account to avoid memory control issues.

Therefore, the traditional memory patching schemes discussed above include many undesirable inefficiencies and require space and time overhead. Memory patching is only one example of the use of program redirection, since many data processing systems may have other uses for program redirection. Therefore, a need exists for a flexible and low overhead (in space and time) solution to program flow redirection, such as in the case of memory patching.

BRIEF DESCRIPTION OF THE DRAWINGS

The present invention is illustrated by way of example and not by limitation in the accompanying figures, in which like references indicate similar elements, and in which.

Figure 1:
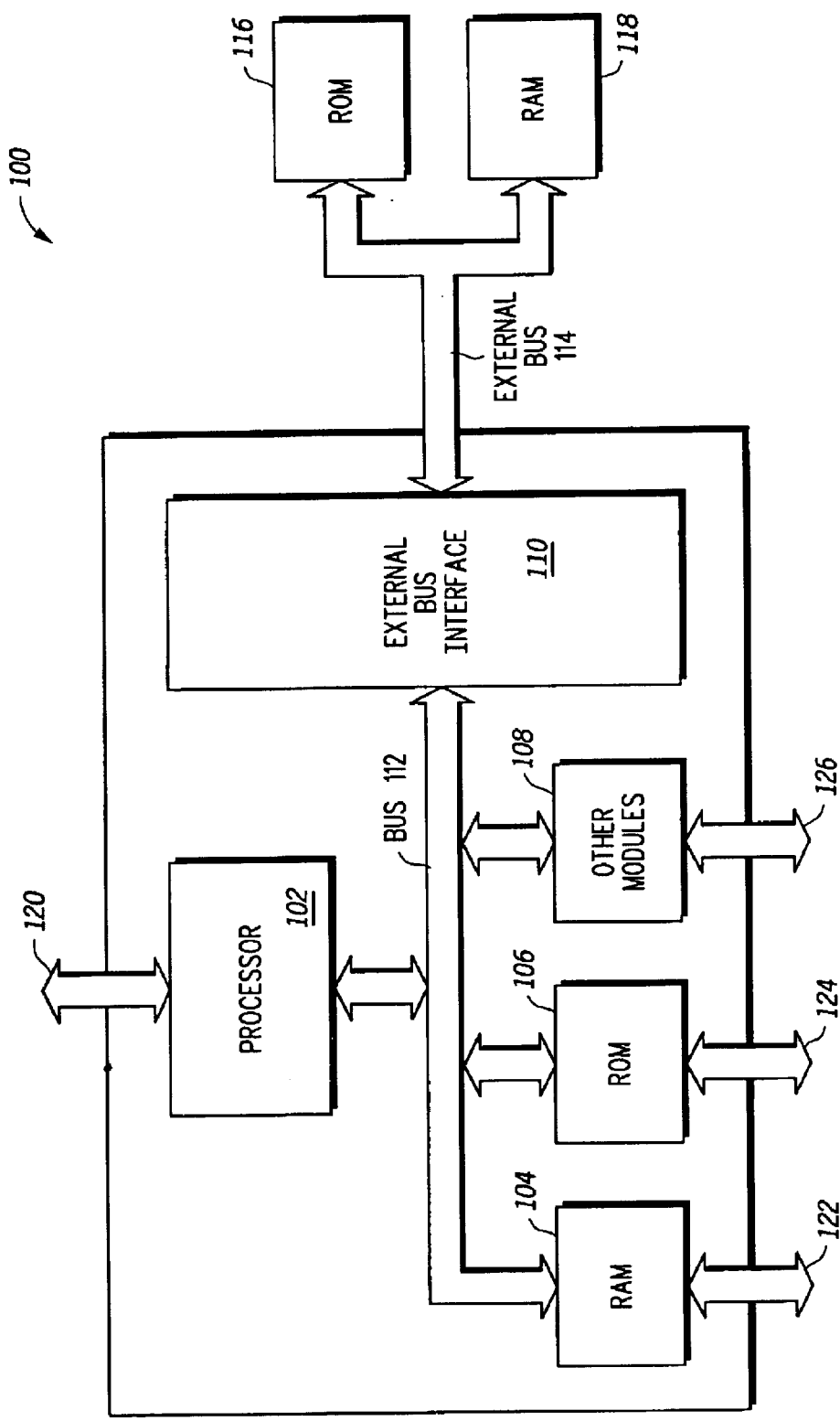
FIG. 1 illustrates, in block diagram form, a data processing system according to one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Embodiments of the present invention relate generally to data processing systems having circuitry for redirecting program flow. For example, one aspect of the present invention relates to a data processing system having a data processor for executing instructions, a memory coupled to the data processor for providing instructions to the data processor for execution, and circuitry that redirects program flow by identifying an address corresponding to an instruction provided to the data processor for which program execution should be redirected when the instruction is decoded by the data processor. The circuitry also generates a control field having an offset specifically corresponding to the address and using the control field to determine when program flow should be redirected. The circuitry creates a redirected address value by combining a portion of the control field with a predetermined address. The data processor receives the instruction, but discards the instruction prior to execution completion and implements redirection of program flow by utilizing the redirected address value.

Another aspect of the present invention relates to a method for performing program flow redirection. The method includes providing instructions to a data processor for decoding and execution, and identifying an address corresponding to an instruction provided to the data processor for which program execution is to be redirected. The method further includes generating a control field having an offset specifically corresponding to the address, and using the control field to determine when program flow should be redirected and creating a redirected address value by combining a portion of the control field and a predetermined address. The instruction is discarded prior to execution completion and the data processor implements redirection of program flow by using the redirected address value and without providing the data processor with substitute code in order to redirect execution.

Another aspect of the present invention relates to a data processing system having a data processor for executing instructions that load data from memory, a memory coupled to the data processor for providing data to the data processor in response to the instructions, and circuitry that redirects a data access by identifying an address corresponding to a data access requested by an instruction for which a substitute data value should be provided. The circuitry also generates a control field having an offset specifically corresponding to the address and using the control field to determine when program flow should be redirected. The circuitry creates a redirected address value by combining a portion of the control field with a predetermined address. The data processor implements redirection of a data access by utilizing the redirected address value to access the substitute data value.

Yet another aspect of the present invention relates to a method for redirecting a data access in a data processing system. The method includes providing instructions to a data processor for execution, and identifying an address corresponding to a data access provided to the data processor in response to an instruction for loading data from memory and for which a substitute data value is to be provided. The method further includes generating a control field having an offset specifically corresponding to the address, and using the control field to determine when data accesses should be redirected and creating a redirected address value by combining a portion of the control field and a predetermined address. The data processor implements redirection by using the redirected address value to access the substitute data value.

As used herein, the term "bus" is used to refer to a plurality of signals or conductors which may be used to transfer one or more various types of information, such as data, addresses, control, or status. The terms "assert" and "negate" is used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Brackets are used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

FIG. 1 illustrates a data processing system 100 in accordance with one embodiment of the present invention. Data processing system 100 may be a microprocessor, microcontroller, digital signal processor, or the like. Data processing system 100 includes a processor 102, RAM 104, ROM 106, other modules 108, and external bus interface 110, each bi-directionally coupled via bus 112. Processor 102 may be optionally coupled external to data processing system 100 by way of integrated circuit terminals 120. RAM 104, ROM 106, and other modules 108 may also be coupled external to data processing system 100 by way of integrated circuit terminals 122, 124, and 126, respectively. External bus interface 110 may be bidirectionally coupled to external memory such as ROM 116 and RAM 118 via an external bus 114. Therefore, ROM 116 and RAM 118 may be considered off-chip or external memories, while RAM 104 and ROM 106 may be considered on-chip, internal, or embedded memories. Therefore, in one embodiment of the present invention, processor 102, RAM 104, ROM 106, other modules 108, external bus interface 110 and bus 112 may all be located on a same integrated circuit.

Data processing system 100 may include more or fewer modules and memories than those illustrated in FIG. 1. Other modules 108 may include another memory module, an analog-to-digital converter, a timer module, a serial communications module, a general purpose input/output module, or the like. Also, in alternate embodiments, the memories illustrated in FIG. 1, such as RAM 104, ROM 106, ROM 116, and RAM 118 may be any type of memory other than RAM or ROM, including, but not limited to, static random access memory, dynamic random access memory, or any type of non-volatile memory, such as for example, flash, or any other storage device. Also, in one embodiment, data processing system 100 may a pipelined processor having, for example, fetch, decode, execute, and write back stages.

In operation, processor 102 is bidirectionally coupled to ROM 106 where ROM 106 may include executable program code. However, some of the code within ROM 106 may require code patches that may be located either in a different location within ROM 106 or in other memories such as RAM 104, ROM 116, RAM 118, or any other memory coupled to processor 102. Alternatively, ROM 106 may include data accessed by code executing on processor 102. This data may likewise require patches containing substitute data that may reside in a different location within ROM 106 or in any other memory coupled to processor 102. Therefore, during execution of program code, processor 102 may need to redirect program flow in order to execute code patches or access substitute data. Operation of processor 102 will be understood further in reference to FIGS. 2 and 3 below.

Figure 2:
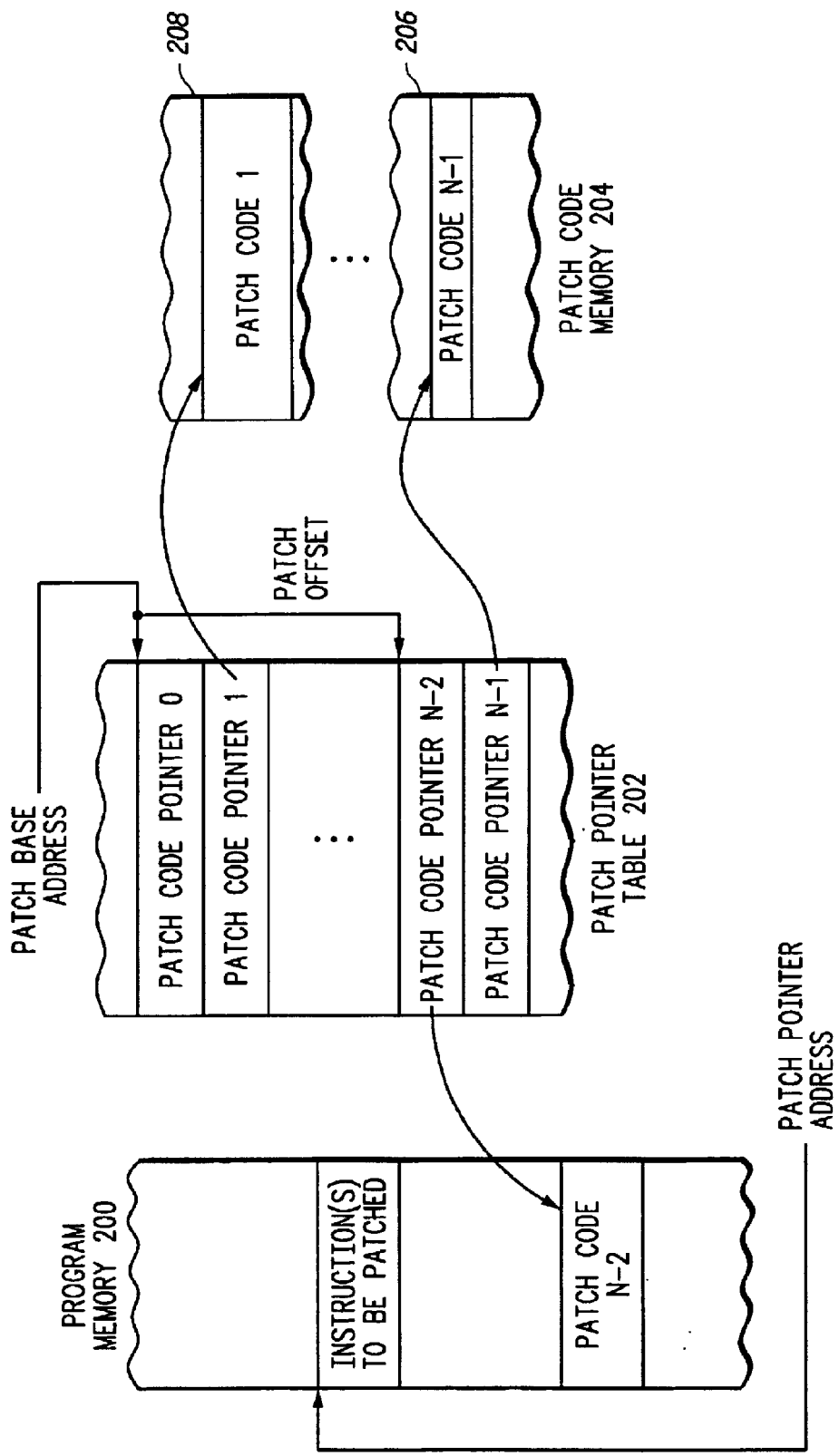
FIG. 2 illustrates, in block diagram form, portions of a program memory, a patch pointer table, and a patch code memory in accordance with one embodiment of the present invention.

FIG. 2 illustrates portions of a program memory 200, a patch pointer table 202, and patch code memory 204. Program memory 200 may reside in any memory within data processing system 100, such as, for example, in ROM 106. Program memory 200 includes executable code to be run by processor 102, including instructions to be patched. These instructions may include a single instruction or a group of instructions that need to be patched with corrected versions of code. In alternate embodiments, program memory 200 may reside in an external ROM such as ROM 116 or in any other embedded or external memory. Generally, program memory 200 resides in a read only memory which creates a need for memory patching. However, program memory 200 may reside in any memory requiring program flow redirection for reasons other than memory patching. As the code in program memory 200 executes, upon reaching the instructions to be patched (located at patch pointer address), processor 102 redirects flow by modifying the current program counter value, and subsequently fetches instructions from a new memory location for execution. The code residing in program memory 200 may also include other instructions to be patched, each located at various patch pointer addresses.

Processor 102 may also execute code which requires data accesses, such as, for example, in response to a load instruction. The accessed data may be stored in any memory coupled to processor 102, such as, for example, ROM 106, RAM 104, ROM 116, and RAM 118. This data may include errors and may be stored in read only memory, which also creates a need for memory patching. In response to a processor instruction requesting incorrect data, substitute data stored at an alternate address location may need to be provided instead. Therefore, in response to a data access, processor 102 may redirect flow and fetch data from a new memory location which is different from the original data location.

Each portion of instructions to be patched (or data to be patched) corresponds to a patch code pointer which may be located in a patch pointer table such as patch pointer table 202. Patch pointer table 202 therefore includes patch code pointer 0 through patch code pointer N−1, where each patch code pointer may correspond to one instruction or group of instructions to be patched or to data access addresses requiring substitute data values. For example, upon accessing a patch pointer address or a data address requiring a substitute data value, processor 102 utilizes patch pointer table 202 to locate the corresponding patch code. Patch code pointers may provide a patch code address which redirects program flow to a patch code memory (such as patch code memory 204) containing the actual patch code to be executed. Therefore, the instructions to be patched in program memory 200 may correspond, for example, to patch code pointer 1. Therefore, upon reaching the patch pointer address, patch code pointer 1 is used to redirect program flow to patch code 1 within patch code memory 204. At the end of patch code 1, a flow redirection instruction may return flow back to program memory 200 to continue normal execution of the code until a next patch pointer address is encountered.

Likewise, in response to a data access requiring a patch, processor 102 may utilize patch pointer table 202 to locate substitute data values. For example, patch code pointer N−1, corresponding to patch code N−1, may be used to redirect flow in response to a processor instruction to load data where patch code N−1 may include instructions to fetch the substitute data values. In alternate embodiments, rather than redirecting flow to execute alternate instructions to fetch the substitute data, patch N−1 may store the substitute data value or values themselves. Each patch code pointer in patch pointer table 202 therefore corresponds to a patch code portion (containing instructions or data) residing in patch code memory 204. Instruction patch code therefore includes instructions executed in response to a patch pointer address while data patch code generally includes instructions executed in response to a data access requiring substitute data values. However, as used herein, data patch code may also refer to alternate embodiments where the data patch code may include the substitute data values themselves (rather than instructions) which are provided in response to the data access.

Note that the patch codes may each reside in separate memories or may even reside within program memory 200. As illustrated by patch code pointer N−2, program flow is redirected to patch code N−2, which resides in the program being executed within program memory 200. Therefore, patch code memory 204 may reside in RAM 104, RAM 118, or in any other embedded or external memory module. Portions (e.g. 208 and 206) of patch code memory 204 may even reside in different memories. Likewise, patch pointer table 202 may be stored within any memory and may be user programmable. Also note that each patch code pointer within patch pointer table 202 may be referenced by a patch base address and a corresponding patch offset, as illustrated in FIG. 2.

As discussed above, patch pointer table 202 may include patch code pointers that correspond to both instruction and data patch codes, where the instruction and data patch code pointers are interspersed within patch pointer table 202. Alternate embodiments may separate those patch code pointers corresponding to data patch codes from those corresponding to instruction patch codes into two separate patch code tables. The two patch code tables can be contiguous to each other and still utilize a single patch base address for both tables, or may be located in different locations, thus requiring different patch base addresses. Also, in alternate embodiments, patch pointer table 202 may include the corresponding patch code itself rather than just a pointer to the patch code. That is, patch pointer table 202 may be modified to include the instruction or data patch code itself. Alternatively, as will be discussed further below, patch pointer table 202 may include patch code pointers that redirect flow to instruction patch code and may also include substitute data (rather than patch code pointers that have to redirect flow to data patch code).

Figure 3:
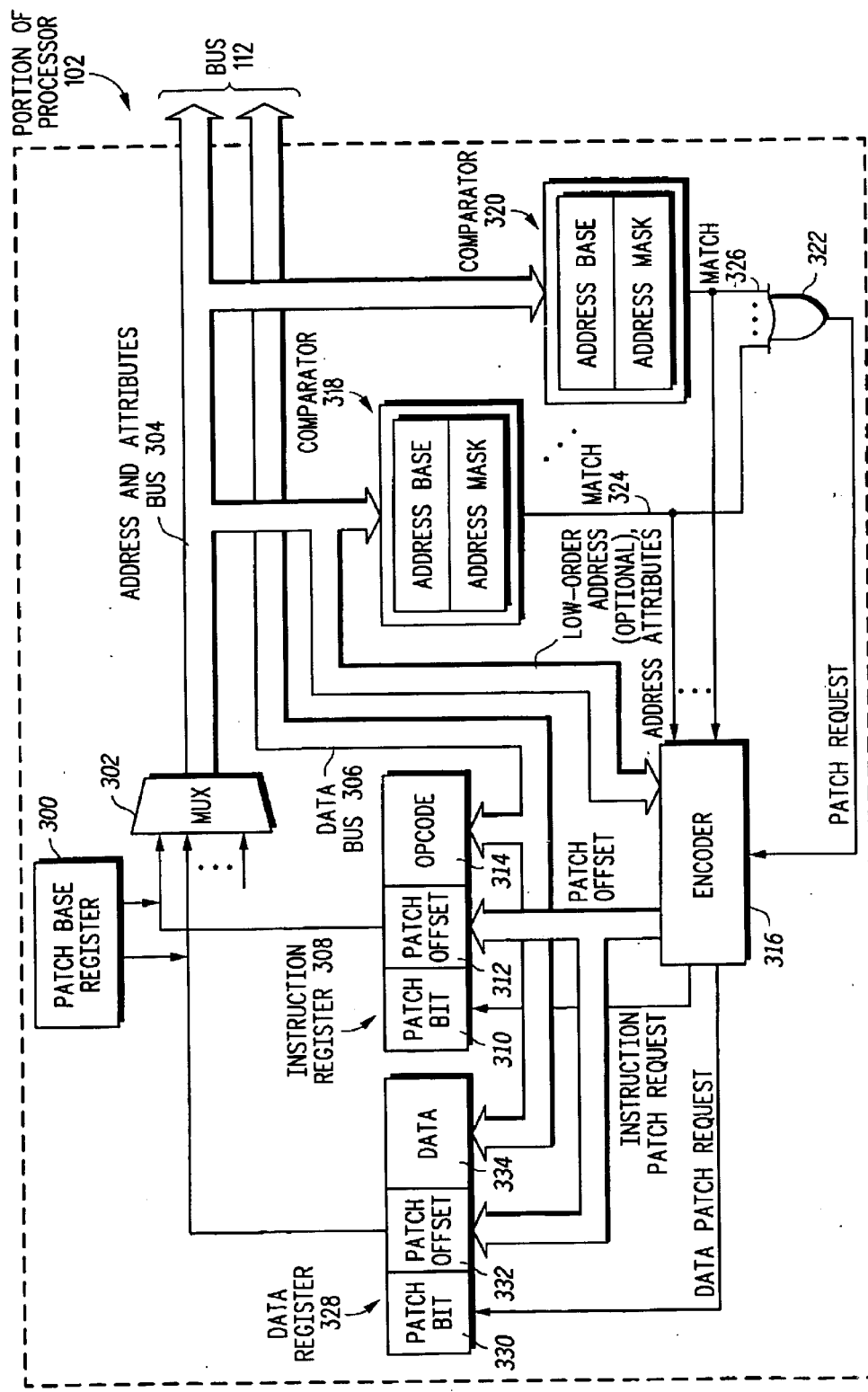
FIG. 3 illustrates, in partial block diagram and partial schematic form, a portion of the processor of FIG. 1 in accordance with one embodiment of the present invention.

FIG. 3 illustrates in block diagram form a portion of processor 102 of FIG. 1 in accordance with one embodiment of the present invention. Portion of processor 102 includes patch base register 300, multiplexer (MUX) 302, instruction register 308, data register 328, comparator 318, comparator 320, encoder 316, and OR gate 322. Instruction register 308 includes patch bit 310, patch offset 312, and opcode 314. Patch bit 310 and patch offset 312 may also be referred to as a patch control field corresponding to opcode 314. Data registers 328 includes patch bit 330, patch offset 332, and data 334. Patch bit 330 and patch offset 332 may be referred to as a patch control field corresponding to data 334.

Comparators 318 and 320 may each be a maskable address comparator, each including an address base and an address mask.

Patch base register 300 is coupled to instruction register 308, data register 328, and MUX 302. MUX 302 provides addresses and address attributes external to processor 102 and to encoder 316 via address and attribute bus 304. Address attributes describe the type of access and other information corresponding to access addresses, such as whether the access is a program (i.e. instruction) access, or a data access. Other attributes may also be provided by way of address and attribute bus 304. Comparators 318 and 320 may therefore also utilize address attributes when performing address comparisons. Data bus 306 provides data and opcodes to data 334 and opcode 314, respectively, and sends and receives data to and from memories external to processor 102, such as, for example, RAM 104, ROM 106, RAM 116, RAM 118, and other modules 108. Address and attribute bus 304 and data bus 306 form portions of internal bus 112 of FIG. 1. Encoder 316 provides PATCH OFFSET to patch offset 312 and patch offset 332, and optionally receives LOW-ORDER ADDRESS bits from address and attribute bus 304. Comparators 318 and 320 each receive addresses and attribute types via address and attribute bus 304 and each provide a match signal (MATCH 324 and 326, respectively) to encoder 316 and OR gate 322. OR gate 322 provides PATCH REQUEST to encoder 316 which provides instruction patch request to patch bit 310 and data patch request to patch bit 330.

Alternate embodiments may include more comparators such as comparators 318 and 320 where each comparator provides a corresponding match input to OR gate 322. In one embodiment, each comparator is a maskable address comparator that corresponds to an address or address range that triggers a memory patch, where a memory patch may correspond to program (i.e. instruction) memory or data memory. Likewise, OR gate 322 may be an N-input OR gate for receiving one match indicator (such as MATCH 324 and 326) from each comparator. Each match indicator is also provided to encoder 316. Therefore, the number of comparators may vary depending on the needs and requirements of data processing system 100.

In operation, inputs to MUX 302 may be received from a variety of locations such as instruction register 308, data register 328, a jump register holding a new address to jump to, or may be calculated from the program counter (PC) and an offset such as in a branch instruction, or may be incremented from the previous address. Comparator 318 and comparator 320 each include an address base and an address mask which allows for maskable address compares which monitor address and attribute bus 304. Therefore, upon an access to an address corresponding to an instruction or data needing to be patched via address and attribute bus 304, (e.g. patch pointer address of FIG. 2), comparator 318 asserts MATCH 324, allowing OR gate 322 to assert PATCH REQUEST. Therefore, each comparator, such as comparator 318 and comparator 320, corresponds to an instruction, section of instructions, data, or section of data to be patched. The address mask may be used to define a range of addresses to be patched. For example, if addresses $1000 through $100F need to be patched, an address base of $1000 with a corresponding address mask of $FFF0 may be utilized to allow any address in that range to trigger a program flow redirection. Alternatively, the address mask may be $FFFF which corresponds to a single instruction (or single data location) to be patched because only one address will cause a match signal to be asserted. Note that in alternate embodiments, comparators 318 and 320 may include upper and lower address bounds to define a range of addresses to be patched rather than an address base and mask.

Comparator 318 and comparator 320 monitor address and attribute bus 304 for a match, and the MATCH outputs from each of the comparators are provided to encoder 316. Generally, at any given time, only one match signal is asserted because each address on address and attribute bus 304 should trigger at most only one comparator to assert its match indicator. Encoder 316 therefore receives each of the match inputs, and depending upon which of the comparators provided the asserted match signal, generates a corresponding offset. For example, if processor 102 includes 8 comparators such as comparator 318 or comparator 320, only one match from the 8 comparators is typically asserted at any given time. Therefore, a three bit offset may uniquely identify each of the 8 match inputs. This three bit unique identifier may also correspond directly to the offset from the patch base address in patch pointer table 202. For example, if the match output from the $8^{th}$ comparator is asserted, the encoder may generate a 3-bit offset of %111 which uniquely identifies the $8^{th}$ comparator and provides an offset from the patch base address (corresponding to the $8^{th}$ location of the patch pointer table) to be provided to patch offset 312 or patch offset 332. Likewise, encoder 316 may generate a patch offset of %110 for the $7^{th}$ comparator, %101 for the $6^{th}$ comparator, %100 for the $5^{th}$, etc. In alternate embodiments, more or fewer bits may be required to uniquely identify each comparator. Alternate embodiments may also translate each unique identifier into an offset corresponding to a location within patch pointer table 202. Alternate embodiments may also combine multiple asserted match indicators to form a unique patch offset.

If a comparator asserts a match indicator (such as MATCH 324 or 326) for an access address provided via address and attribute bus 304, encoder 316, using the attributes provided via address and attribute bus 304, determines whether the access is an instruction or data access. If it is an instruction access requiring the patch, encoder 316 asserts instruction patch request to set patch bit 310, and provides the encoded patch offset value to patch offset 312. If it as a data access requiring the patch, encoder 316 asserts data patch request to set patch bit 330 and provides the encoded patch offset value to patch offset 332. Therefore, each opcode (such as opcode 314) and each data (such as data 334) has a corresponding patch bit 310 and 330, respectively, to indicate whether a patch is required, and a corresponding patch offset 312 and 332, respectively, to indicate a location within the patch pointer table 202 with respect to the patch base address. Each comparator, such as comparators 318 and 320, may therefore be programmed with either a data address or a program address or a combination of both.

In alternate embodiments of the present invention, a portion of the address provided via address and attribute bus 304, such as the low-order address bits, may be provided to encoder 316, as illustrated in FIG. 3. This allows for finer patching granularity while requiring less comparators. For example, one of the comparators can be set up with an address base and a corresponding address mask which masks the two lower order bits of the address base. Without the use of any low-order address bits, any address that triggers a same comparator to assert its match indicator would result in a same patch offset value provided to patch offset 312 or patch offset 332 (depending on whether the triggering address corresponds to an instruction or data access). For example, comparator 318 may have an address base of $1000 and an address mask of $FFFC. Without the use of any low-order address bits by encoder 316, any address falling within $1000 and $1003 would cause comparator 318 to assert MATCH 324, and in response, encoder 316 would produce a same offset (e.g. %111) for each of the addresses $1000 through $1003. This same offset would likewise correspond to a same piece of patch code. However, in the current embodiment that provides the low-order address bits to encoder 316, encoder 316 may use these lower order bits of the triggering address provided via address and attribute bus 304 to form separate offsets for each address within the address range $1000 to $1003, thus allowing each address within the range to correspond to a separate entry in patch pointer table 202 and likewise correspond to a separate patch code. (Note that the triggering address refers to an instruction or data access address, provided via address and attribute bus 304, that triggers a memory patch.)

For example, in this embodiment using the low-order address bits, an asserted MATCH 324 provided by comparator 318 would allow encoder 316 to provide an offset value which can be used as the upper order bits of patch offset 312 or patch offset 332, while the two lower order bits of the triggering address can correspond to the lower order bits of patch offset 312 or patch offset 332. Therefore, a unique table entry within patch pointer table 202 can correspond to each unique value of the triggering address within a given address range. If comparator 318 is encoded to provide a %000 offset, and the lower two bits of the triggering address (received via address and attribute bus 304) is %01, then encoder 316 may provide %00001 to patch offset 312 or patch offset 332 (depending on whether the triggering address corresponds to an instruction or data access). If the lower two bits of the triggering address is %11, then encoder 316 would provide %00011 to patch offset 312 or patch offset 332 (again, depending on whether the triggering address corresponds to an instruction or data access). Therefore, in this example, one comparator with a corresponding address mask may be used to map to four different entries in patch pointer table 202 which may correspond to four different entries of patch code memory 204. Depending on the number of low-order address bits used, finer granularity can be achieved (resulting in more entries in patch pointer table 202). Also note that in alternate embodiments, other bits may be provided from address and attribute bus 304 to encoder 316 other than the low-order bits (for example, midrange or upper order bits may instead be provided).

Note that in one embodiment, an address is provided via address and attribute bus 304 during a first clock cycle, and data may be returned via data bus 306 during a later cycle. For example, an address may be sent during a first cycle, and an opcode returned to instruction register 308 during a later cycle. Therefore, the opcode returned to opcode 314 via data bus 306 is invalid if patch bit 310 is set because patch bit 310 indicates that a patch is required. In one embodiment, patch bit 310 and patch offset 312 are updated upon receipt of an opcode via data bus 306. Therefore, patch bit 310 and patch offset 312 may be an extension of instruction register 308 and clocked at the same time as opcode 314. In alternate embodiments, patch bit 310 and patch offset 312 may not be an extension of instruction register 308, but may be located in separate registers or memory locations that are associated with instruction register 308. Therefore, each fetched opcode has an associated patch bit 310 and patch offset 312. If patch bit 310 is set, the associated opcode 314 is invalid, and if patch bit 310 is clear, opcode 314 is valid. Upon opcode 314 entering the decode stage of the pipeline and if a patch is indicated (e.g. patch bit 310 is set), opcode 314 is discarded and patch offset 312 is combined with patch base register 300 and provided via address and attribute bus 304 to access the corresponding patch code. In one embodiment, patch base register 300 is a user programmable register containing the patch base address; however, in alternate embodiments, the patch base address may be a fixed value in memory.

In the embodiment illustrated in FIG. 3, instruction register 308 may be considered a single entry buffer, where upon receiving an opcode via data bus 306, this opcode is known to be the next opcode to be decoded. However, in alternate embodiments, instruction register 308 may be a buffer including a plurality of instruction registers forming an instruction queue. Each opcode (such as opcode 314) within the instruction queue would have a corresponding patch bit and patch offset (such as patch bit 310 and patch offset 312) that may have been set upon storing the opcode in the instruction queue. Upon each opcode reaching the decode stage of the pipeline (i.e. reaching the top of the instruction queue), a new address is generated based upon the patch offset and patch base register 300 if patch bit 310 is set. That is, if the patch bit of the corresponding opcode that is entering the decode stage is set, the patch page register 300 and patch offset 312 are used to provide the correct patch code pointer from patch pointer table 202 via address and attribute bus 304. Therefore, as discussed above, flow will be properly redirected to execute the corresponding patch code.

In addition to instruction redirection for patching program instructions as discussed above, processor 102 of FIG. 3 may also be used to cause program redirection in response to detecting data addresses or address ranges wherein the data returned in response to a processor instruction to load data from memory needs to be substituted for. For example, data register 328 may hold data read from memory in response to a load instruction. Upon detecting a match of a data address requiring data substitution, encoder 316 provides a patch offset, (generated as described above) to patch offset 332. Patch offset 332 may be stored with returning data via data bus 306 as an extension to data register 328 of processor 102 (as illustrated in FIG. 3), or may be stored in a separate storage location associated with data register 328 of processor 102. If patch bit 330 is set, patch offset 332 is combined with patch base register 300 to select a patch code pointer to redirect program execution to patch data code which is used to provide an alternate data value in place of the originally accessed data. That is, the data patch code may contain alternate instructions used to provide the substitute or alternate data values. When performing program redirection for data accesses, the original instruction may be allowed to complete, and is not required to be discarded; however, the data obtained in data 334 may be overwritten by the patch data code.

As discussed above, alternate embodiments may redirect data accesses and perform data substitution rather than redirect program flow. For example, in one embodiment, the selected patch code pointer (selected from patch pointer table 202 based on patch base register 300 and patch offset 332), may be used to directly access the substitute data values which may be stored in the corresponding data patch code. Therefore, in this embodiment, data (rather than instructions) may be stored in the corresponding data patch code.

Alternatively, data substitution may be performed by placing the substitute data in place of a patch code pointer in patch pointer table 202. That is, the generated patch offset stored in patch offset 332 selects the substituted data instead of a patch code pointer from patch table 202. In this embodiment, the patch pointer table 202 may hold both patch code pointers and substitute data (as described above in reference to FIG. 2). That is, entries within patch pointer table 202 contain both patch code pointers which are utilized for program redirection, and substitute data entries which are used when performing data substitution. In contrast to redirecting program flow, the value obtained from patch pointer table 202 replaces the previously fetched data. In this manner, the data substitution is performed with lower overhead relative to using program redirection. No additional instructions need be executed to perform the data substitution; instead, processor 102 automatically retrieves the substitute data from an entry within patch pointer table 202 in response to a patch request associated with a data address which matches a value stored in comparators (such as comparators 318 and 320). The overhead is reduced to a single additional data fetch from an entry in patch pointer table 202.

In an alternate embodiment, patch bit 310 and patch bit 330 are optional. (In this case, the patch control fields would refer to patch offset 312 and patch offset 332, not including patch bit 310 and patch bit 330.) In this embodiment, a default offset of zero can be set for patch offset 312 and patch offset 332 any time no match signal is asserted. Therefore, any patch offset value 312 or patch offset value 332 which is not zero would indicate a patch is required. In this embodiment, the first entry corresponding to entry zero in the patch pointer table would not be utilized, and the first table entry would be located at table entry 1 (e.g. patch code pointer 1 of FIG. 2), thus providing an offset of 1. Similarly, alternate default values may be used to indicate a patch or no patch condition. For example, rather than a default of all zeros, a default of all ones may be used to indicate that no patch is required.

Data processor 102 of FIG. 3 may perform both program (instruction) and data patching, as discussed above. However, in alternate embodiments, data processor 102 may support only instruction patching, thus requiring a patch control field corresponding to instruction register 308 and not data register 328. Likewise, data processor 102 may support only data patching, thus requiring a patch control field corresponding to data register 328 and not instruction register 308. Also, in alternate embodiments, if instruction register 308 is a single instruction buffer and not an instruction queue, data register 328 and instruction register 308 may share a same patch control field. Also, if separate patch point tables are used to store instruction patch code pointers and data patch code pointers (or the substitute data itself), patch base register 300 may be a plurality of user programmable registers to hold a patch base address corresponding to each of data register 328 and instruction register 308. In alternate embodiments, circuitry may be used to select one of the outputs from patch offset 332 and patch offset 312 and combine the selected output with patch base register 300 in order to provide a single input to MUX 302 corresponding to the updated patch address.

In the embodiments discussed above, program flow redirection (and data substitution) can be performed utilizing a control field (e.g. patch offset 312, patch offset 332) without changing the current execution context and without providing processor 102 a substitute opcode (such as an absolute jump) in order to redirect execution. For example, if data processing system 100 is operating in user mode and a program flow redirection is detected, data processing system 100 may remain in user mode while redirecting program flow. Therefore, it can be appreciated the savings in overhead by not having to enter supervisor mode to handle the flow redirection as is done in prior art systems that force exceptions to perform memory patching. It can also be appreciated that the program flow redirection discussed in reference to embodiments of the current invention does not require any added delay path on the time critical data input path (such as data bus 306) as is required in those prior art systems that utilize opcode substitution in order to redirect flow. Also, embodiments of the present invention can be used in many applications outside memory patching. For example, embodiments of the present invention may be utilized for exception handling without needing to exit the current execution mode (where the current execution mode may be user or supervisor mode). Remaining in the current execution mode (or context) results in significant reduction in overhead, including removing the need to save current state information, perform context switching, reload new context information, and later having to restore the originally executing context state information.

In the foregoing specification, the invention has been described with reference to specific embodiments. However, one of ordinary skill in the art appreciates that various modifications and changes can be made without departing from the scope of the present invention as set forth in the claims below. For example, the above methods and circuitry can be applied generally to memory patching, or even more generally, to any data processing system requiring program flow redirection. Although memory patching was provided as an example, the above descriptions are not mean to limit application of the embodiments discussed to memory patching. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system comprising:
   a data processor for executing instructions; and
   a memory coupled to the data processor, the memory providing instructions to the data processor for execution;
   the data processing system further comprising:
      circuitry that redirects program flow by identifying an address corresponding to an instruction provided to the data processor for which program execution should be redirected when the instruction is decoded by the data processor, the circuitry for redirecting program flow also generating a control field having an offset specifically corresponding to the address and using the control field to determine when program flow should be redirected, the circuitry for redirecting program flow creating a redirected address value by combining a portion of the control field to a predetermined address, the data processor receiving the instruction, but discarding the instruction prior to execution completion, the data processor implementing redirection of program flow by utilizing the redirected address value, wherein the data processing system is in either a user mode context or a supervisor context and no change in context occurs upon redirecting program flow.

2. The data processing system of claim 1 further comprising:
   a first storage device wherein the redirected address value is used to form a pointer into the first storage device, the first storage device containing a plurality of code pointers; and
   a second storage device, the second storage device containing code for execution by the data processor in lieu of the instruction that was received but discarded.

3. The data processing system of claim 2 wherein the code in the second storage device is executed by the data processor without providing the data processor a substitute operational code (opcode) value in order to redirect execution.

4. The data processing system of claim 1 wherein the circuitry that redirects program flow is redirecting program flow to implement memory patching of the memory wherein user identified instructions which the memory provides to the data processor are substituted with alternate instructions.

5. The data processing system of claim 1 wherein the circuitry that redirects program flow further comprises:
   compare circuitry for receiving addresses corresponding to memory locations in the memory and comparing the addresses to one or more predetermined addresses, the compare circuitry providing a match output signal in response to detecting a match;
   an encoder coupled to the compare circuitry, the encoder translating a match output signal to a predetermined offset value and generating the control field in response thereto; and
   a register coupled to the encoder for receiving and storing the control field.

6. The data processing system of claim 5 wherein the compare circuitry further comprises:
   an address mask that reduces a number of address bits that are used to detect the match, the address mask expanding a total number of address values that trigger redirecting program flow.

7. The data processing system of claim 1 further comprising:
   a base register for staring the predetermined address, the predetermined address being variable by a user or the data processing system and permitting additional flexibility regarding where redirection of program flow is made.

8. A data processing system comprising:
   a data processor for executing instructions; and
   a memory coupled to the data processor, the memory providing instructions to the data processor for execution;
   the data processing system further comprising:
      circuitry that redirects program flow by identifying an address corresponding to an instruction provided to the data processor for which program execution should be redirected when the instruction is decoded by the data processor, the circuitry for redirecting program flow also generating a control field having an offset specifically corresponding to the address and using the control field to determine when program flow should be redirected, the circuitry for redirecting program flow creating a redirected address value by combining a portion of the control field to a predetermined address, the data processor receiving the instruction, but discarding the instruction prior to execution completion, the data processor implementing redirection of program flow by utilizing the redirected address value, wherein the circuitry that redirects program flow further comprises:

compare circuitry for receiving addresses corresponding to memory locations in the memory and comparing the addresses to one or more predetermined addresses, the compare circuitry providing a match output signal in response to detecting a match;

an encoder coupled to the compare circuitry, the encoder translating a match output signal to a predetermined offset value and generating the control field in response thereto; and a resister coupled to the encoder for receiving and storing the control field, wherein the register is an extension of an instruction register which stores the instruction within the data processor.

9. A data processing system comprising:

a data processor for execute instructions; and a memory coupled to the data processor, the memory providing instructions to the data processor for execution;

the data processing system further comprising:

circuitry that redirects program flow by identifying an address corresponding to an instruction provided to the data processor far which program execution should be redirected when the instruction is decoded by the data processor, the circuitry for redirecting program flow also generating a control field having an offset specifically corresponding to the address and using the control field to determine when program flow should be redirected, the circuitry for redirecting program flow creating a redirected address value by combining a portion of the control field to a predetermined address, the data processor receiving the instruction, but discarding the instruction prior to execution completion, the data processor implementing redirection of program flow by utilizing the redirected address value, wherein the circuitry that redirects program flow further comprises:

compare circuitry for receiving addresses corresponding to memory locations in the memory and comparing the addresses to one or more predetermined addresses, the compare circuitry providing a match output signal in response to detecting a match;

an encoder coupled to the compare circuitry, the encoder translating a match output signal to a predetermined offset value and generating the control field in response thereto; and a register coupled to the encoder for receiving and storing the control field; and the data processing system further comprising:

an address bus coupled to the encoder for coupling a predetermined portion of address hits of the addresses corresponding to memory locations in the memory for us in generating the control field, the use of the predetermined portion of address bits creating additional control field values.

10. A method of redirecting program flow in a data processing system comprising:

providing instructions to a data processor for decoding and execution;

identifying an address corresponding to an instruction provided to the data processor for which program execution is to be redirected;

generating a control field having an offset specifically corresponding to the address;

storing the control field in an instruction register; and using the control field to determine when program flow should be redirected and creating a redirected address value by combining a portion of the control field and a predetermined address, wherein the instruction is discarded prior to execution completion and the data processor implements redirection of program flow by using the redirected address value and without providing the data processor with substitute code in order to redirect execution.

11. The method of claim 10 wherein the step of generating a control field further comprises:

generating at least one bit which indicates that program redirection should occur; and generating one or more bits as the portion of the control field that is combined with the predetermined address, the one or more bits representing an offset value and the predetermined address representing a base address.

12. The method of claim 10, wherein the step of generating a control field further comprises:

generating an offset value to combine with the predetermined address if program redirection should occur; and generating a predetermined default value if program redirection should not occur.

13. The method of claim 10 further comprising:

using the redirected address value as a ROM patch address to address a patch pointer table, the patch pointer table containing a plurality of patch code pointers; and selecting one of the plurality of patch code pointers and using the one of the plurality of patch code pointers to address a patch code memory, the patch code memory containing code which is substituted for the instruction.

14. The method of claim 10 wherein the identifying the address corresponding to the instruction provided to the data processor further comprises recognizing whether the address has an address value within a range of addresses or recognizing when a predetermined number of bits of the address have one or more predetermined values to generate the control field.

15. The method of claim 10 further comprising:

using a storage device to store the predetermined address, the storage device allowing a user of the data processing system to vary where program flow redirection occurs.

16. A data processing system with memory patching comprising:

a data processor for executing instructions:

embedded memory contained within a same integrated circuit as the data processor and coupled to the data processor containing instructions which need to have execution avoided if addressed;

external memory coupled to the data processor and embedded memory, the external memory being external to the same integrated circuit; and circuitry within the same integrated circuit that implements a memory patch by identifying an address corresponding to an instruction provided to the data processor for which a memory patch is required, the circuitry for implementing the memory patch also generating a control field having an offset specifically assigned to the address and using the control field to signal that a memory patch should occur, the circuitry for implementing the memory patch creating a redirected memory patch address value by combining a portion of the control field to a predetermined base address, the data processor receiving the instruction, but discarding the instruction prior to execution completion, the data processor implementing the memory patch by utilizing the redirected memory patch address value, wherein the data processing system is in either a user mode context or a supervisor context and implementing the memory patch does not change the context of the data processing system.

17. The data processing system of claim 16 further comprising means for permitting a user to vary a target memory location where the redirected memory patch address value ultimately points program execution to.

18. The data processing system of claim 16 wherein the redirected memory patch address value is an address in a memory patch pointer table containing memory patch code pointers, each of the memory patch code pointers pointing to code in a patch code memory which is used in lieu of the instruction.

19. A data processing system comprising:
a data processor for executing instructions that load data from memory; and
a memory coupled to the data processor, the memory providing data to the data processor in response to the instructions;
the data processing system further comprising:
circuitry that redirects a data access by identifying an address corresponding to a data access requested by an instruction for which a substitute data value should be provided, the circuitry for redirecting also generating a control field having an offset specifically corresponding to the address and using the control field to determine when the data access should be redirected, the circuitry for redirecting creating a redirected address value by combining a portion of the control field to a predetermined address, the data processor implementing redirection of a data access by utilizing the redirected address value to access the substitute data value.

20. The data processing system of claim 19 further comprising:
a first storage device wherein the redirected address value is used to form a pointer into the first storage device, the first storage device containing a plurality of code pointers; and
a second storage device, the second storage device containing the substitute data which is referenced by one of the plurality of code pointers.

21. The data processing system of claim 19 further comprising:
a first storage device wherein the redirected address value is used to form a pointer into the first storage device, the first storage device containing a plurality of code pointers; and
a second storage device, the second storage device containing an instruction to access the substitute data which is referenced by one of the plurality of code pointers.

22. The data processing system of claim 21 wherein the instruction in the second storage device is executed by the data processor without providing the data processor a substitute operational code (opcode) value in order to redirect execution.

23. The data processing system of claim 19 further comprising:
a first storage device wherein the redirected address value is used to form a pointer into the first storage device, the first storage device containing the substitute value.

24. The data processing system of claim 19 wherein the circuitry that redirects a data access is redirecting to implement memory patching of the memory wherein accessed data which the memory provides to the data processor are substituted with alternate data values.

25. The data processing system of claim 19 wherein the circuitry that redirects a data access further comprises:
compare circuitry for receiving addresses corresponding to memory locations in the memory and comparing the addresses to one or more predetermined addresses, the compare circuitry providing a match output signal in response to detecting a match;
an encoder coupled to the compare circuitry, the encoder translating a match output signal to a predetermined offset value and generating the control field in response thereto; and
a register coupled to the encoder for receiving and storing the control field.

26. The data processing system of claim 25 wherein the register is an extension of a data register which stores data received in response to data accesses.

27. The data processing system of claim 25 further comprising:
an address bus coupled to the encoder for coupling a predetermined portion of address bits of the addresses corresponding to memory locations in the memory for use in generating the control field, the use of the predetermined portion of address bits creating additional control field values.

28. The data processing system of claim 19 wherein the data processing system is in either a user mode context or a supervisor context and no change in context occurs upon redirecting program flow.

29. A method of redirecting data accesses in a data processing system comprising:
providing instructions to a data processor for execution;
identifying an address corresponding to a data access provided to the data processor in response to an instruction for loading data from memory and for which a substitute data value is to be provided;
generating a control field having an offset specifically corresponding to the address; and
using the control field to determine when data accesses should be redirected and creating a redirected address value by combining a portion of the control field and a predetermined address, wherein the data processor implements redirection by using the redirected address value to access the substitute data value.

30. The method of claim 29 wherein the step of generating a control field further comprises:
generating at least one bit which indicates that redirection should occur; and
generating one or more bits as the portion of the control field that is combined with the predetermined address, the one or more bits representing an offset value and the predetermined address representing a base address.

31. The method of claim 29, wherein the step of generating a control field further comprises:

generating an offset value to combine with the predetermined address if redirection should occur; and generating a predetermined default value if redirection should not occur.

32. The method of claim 29 further comprising:

using the redirected address value as a ROM patch address to address a patch pointer table, the patch pointer table containing a plurality of patch code pointers; and selecting one of the plurality of patch code pointers and using the one of the plurality of patch code pointers to address a patch code memory, the patch code memory containing the substitute data value.

33. The method of claim 29 further comprising:

using the redirected address value as a ROM patch address to address a patch pointer table, the patch pointer table containing a plurality of patch code pointers; and selecting one of the plurality of patch code pointers and using the one of the plurality of patch code pointers to address a patch code memory, the patch code memory containing the instructions to access the substitute data value.

34. The method of claim 29 further comprising:

using the redirected address value as a ROM patch address to address a patch pointer table, the patch pointer table containing the substitute data value.

35. The method of claim 29 further comprising:

storing the control field in a data register.

* * * * *

UNITED STATES PATENT AND TRADEMARK OFFICE
CERTIFICATE OF CORRECTION

| | | |
|---|---|---|
| PATENT NO. | : 6,865,667 B2 | Page 1 of 1 |
| APPLICATION NO. | : 09/798390 | |
| DATED | : March 5, 2001 | |
| INVENTOR(S) | : William C. Moyer | |

It is certified that error appears in the above-identified patent and that said Letters Patent is hereby corrected as shown below:

In Column 12, Line 50, Claim No. 7:

Change "staring" to --storing--

In Column 13, Line 36, Claim No. 9:

Change "far" to --for--

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 6,865,667 B2  Page 1 of 1
APPLICATION NO. : 09/798390
DATED : March 8, 2005
INVENTOR(S) : William C. Moyer It is certified that error appears in the above-identified patent and that said Letters Patent is hereby corrected as shown below:

In Column 12, Line 50, Claim No. 7:

Change "staring" to --storing--

In Column 13, Line 36, Claim No. 9:

Change "far" to --for--

This certificate supersedes the Certificate of Correction issued May 13, 2008.

Signed and Sealed this

Seventeenth Day of June, 2008

JON W. DUDAS
*Director of the United States Patent and Trademark Office*